United States Patent Office 3,303,224
Patented Feb. 7, 1967

3,303,224
BROMINATION OF AROMATIC COMPOUNDS
John W. Crump, Albion, Mich., assignor to The Dow Chemical Company, Midland, Mich., a corporation of Delaware
No Drawing. Filed Nov. 13, 1963, Ser. No. 323,209
4 Claims. (Cl. 260—650)

This invention is concerned with a new chemical process for brominating aromatic compounds. It is particularly concerned with a new bromination process whereby particular brominated isomers are obtained in good yields.

Organic compounds are conventionally brominated by the application of elemental bromine. When the nucleus of an aromatic compound is brominated in this way, a particular distribution of brominated position isomers is characteristically obtained, depending upon the compound being brominated. The isomer distribution can be varied to some extent in many cases by changing the reaction conditions, for example, the temperature, the use or exclusion of a particular solvent, and so on. However, radical changes in product composition are usually obtainable only by resorting to a brominating agent other than elemental bromine.

In the bromination of toluene, for example, the use of bromine and a catalyst such as iron or iodine yields a monobrominated product of which about 30–40% is the ortho isomer and the balance is substantially the para isomer. Higher proportions of o-bromo-toluene have been obtained by using isolated hypobromous acid as the brominating agent. However, the difficulty in the preparation of the reagent and the conditions required for the reaction prohibit its use even as a laboratory preparatory method.

It has now been found that a compound having an aromatic hydrocarbon nucleus substituted with at least one hydrogen atom replaceable by bromine is readily ring brominated when it is contacted with aqueous bromic acid. This process yields results comparable to those obtained with hypobromous acid, but uses easily available reagents under practical reaction conditions. This new method of bromination has two main advantages over conventional brominations, (1) a higher proportion of the ortho brominated isomer is obtained from a substituted benzene than is ordinarily found when elemental bromine is used, and (2) essentially all of the bromine consumed in the reaction goes into the brominated product whereas conventional bromination converts half of the bromine into hydrogen bromide.

The reaction is carried out in aqueous acid solution, suspension or emulsion and in the substantial absence of halide ion. If, for example, a halide ion such as chloride or bromide is present in the reaction mixture, it is oxidized by the bromic acid to the free halogen which then proceeds to take part in the halogenation and the advantages of the method are, to that extent, lost.

The process is preferably operated by generating bromic acid in situ by combining a water-soluble inorgnaic bromate with a strong mineral acid in an aqueous solution which is maintained in intimate contact with the organic substrate to be brominated. A chemically inert wetting agent or emulsifier may be employed to obtain better contact of the aqueous and organic phases. An auxiliary solvent, preferably water-miscible, may also be used. Suitable solvents include formic acid, acetic acid, p-dioxane, tetramethylene sulfone, and the like.

The process is carried out at a temperature below about 100° C. but above the freezing point of the reaction mixture. Bromic acid is unstable at temperatures above 100° C. The reaction may be run at temperatures below 0° C. so long as a liquid reaction mixture can be maintained but there is no advantage to be gained thereby. A reaction temperature of 0–40° C. is preferred.

Any inorganic, water-soluble bromate can be used in the process as the source of bromic acid. Preferably, an alkali metal bromate such as sodium bromate is used. The bromate preferably should be essentially free of bromide.

Any strong mineral acid or its equivalent which is stable under the reaction conditions can be used to form bromic acid by reacting with the inorganic bromate. Representative of such acids are sulfuric acid, toluenesulfonic acid, nitric acid, and perchloric acid. Hydrogen halides such as HCl and HBr are not stable under the reaction conditions since they are oxidized to liberate free halogen and these acids are not operable in the process. It is usually most convenient to use sulfuric acid. Since the bromination reaction is acid catalyzed, an excess of acid over that required to liberate the theoretical amount of bromic acid gives best results. Preferably, the bromination is carried out in the additional presence of at least one equivalent of such a strong mineral acid per mole of free bromic acid. Mineral acids having an ionization constant at 20° C. greater than about $10^{-3}$ are suitable.

Although this bromination process is applicable to any aromatic compound capable of being brominated on an aromatic nucleus, it is most advantageous when applied to a substituted benzene of the formula

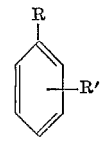

wherein R is lower alkyl, lower alkoxy, aryloxy, or halogen and R' is hydrogen or R. Because the present method is particularly advantageous as a means for preparing ortho bromo isomers, substituted benzenes as shown above where R' is hydrogen or a radical ortho or meta to R constitute the starting materials to which this method is best adapted. Toluene, o-xylene, anisole, phenetole, diphenyl ether, phenoxynaphthalene, chlorobenzene, m-bromotoluene, and o-dimethoxybenzene are illustrative suitable compounds.

The brominating action of bromic acid depends upon its reduction to produce bromine in the +1 oxidation state. Bromic acid is a very strong oxidizing agent and in the absence of added reducing agents, the substrate being brominated or even water itself will serve as the reducing agent. However, the reaction may be facilitated by use of an auxiliary reducing agent. A suitable reducing agent must obviously be a better reducing agent than the aromatic substrate being brominated, yet mild enough to prevent further reduction of bromine below the +1 state before bromination occurs. Mild organic reducing agents such as formaldehyde, formic acid and oxalic acid have been used successfully.

The ratio of bromic acid to aromatic compound is not critical, but to avoid substantial dibromination, it is preferred to use more than one mole of aromatic per mole of bromic acid, for example, about 1.5–2 moles per mole of bromic acid.

The following examples illustrate some ways in which the present invention is advantageously operated.

*Example 1*

A solution of 75.5 g. of sodium bromate in 250 ml. of water was added at 25° C. in one hour to a stirred mixture of 500 ml. of water, 90 ml. of concentrated sulfuric acid, 157 g. of oxalic acid dihydrate, and 92.1 g. of toluene. The mixture was kept emulsified by the presence of 0.25 g. of Tide, a commercial sodium polyphosphate-sodium alkyl sulfate detergent composition. Following the addition, the mixture was poured into one liter of ice water, and the organic portion was separated by extracting three times with 150 ml. quantities of methylene chloride. The combined extracts were washed with 150 ml. of 1 N sodium hydroxide, dried over MgSO₄, and distilled to yield a bromotoluene fraction of 72.6 g., representing a yield of 85% based on the bromate. This material was found by infrared analysis to consist of 66% o-bromotoluene, 33% p-bromotoluene, and 1% m-bromotoluene.

*Example 2*

A solution of 15.1 g. of sodium bromate in 50 ml. of water was added in 2 hours at about 15° C. to a stirred solution of 9.2 g. of toluene in 50 ml. of acetic acid containing 50 ml. of concentrated sulfuric acid. Stirring was continued for one hour after the addition. The reaction mixture was worked up as described in Example 1 to obtain a bromotoluene fraction in which the ortho to para isomer ratio was 2.4 to 1.

*Example 3*

By the procedure described in Example 1, 0.5 g. mole of toluene was brominated with 0.21 g. mole of sodium bromate, and excess sulfuric acid using 50.6 g. of 37% aqueous formaldehyde in place of the oxalic acid. The product, analyzed by gas chromatography, showed a toluene-bromotoluene mole ratio of 56:44, indicating essentially complete utilization of the bromine. Isolation of the bromotoluene peak from a preparative gas chromatographic column and analysis of this by infrared spectroscopy showed an ortho-para ratio of 2.22 to 1.

*Example 4*

Bromination of o-xylene by the method of Example 1 yielded 3-bromo-o-xylene and 4-bromo-o-xylene in a ratio of 1.56 to 1. Conventional bromination gives 4-bromo-o-xylene almost exclusively.

*Example 5*

Bromination of m-xylene by the method of Example 1 yielded 2-bromo-m-xylene and 4-bromo-m-xylene in a ratio of 0.47 to 1. When m-xylene is reacted with bromine under similar conditions very little of the 2-bromo-m-xylene is formed.

*Example 6*

A solution of 8.5 g. of diphenyl ether in 50 ml. of tetramethylene sulfone was treated cautiously with 50 ml. of concentrated sulfuric acid at 10–20° C. To the vigorously stirred mixture there was added a solution of 7.54 g. of sodium bromate in 50 ml. of water at 15–20° C. over a 2 hour period. The reaction mixture was stirred for an additional hour at 20–25° C. and then it was poured into cold water. The organic portion was separated by extraction with methylene chloride and the extract was dried over MgSO₄, concentrated under reduced pressure, and dissolved in ether. The ether solution was washed four times with water to remove tetramethylene sulfone, then it was dried and the ether content was removed by evaporation. Analysis of the product by infrared spectroscopy showed the product to contain 20% 2-bromodiphenyl ether and 37% 4-bromodiphenyl ether, the remainder being unreacted diphenyl ether.

Conventional bromination of diphenyl ether with elemental bromine yields 4-bromodiphenyl ether to the practical exclusion of the ortho isomer.

*Example 7*

A solution of 15.1 g. of sodium bromate in 50 ml. of water was added in 2 hours at room temperature to a stirred solution of 11.3 g. of chlorobenzene and 50 ml. of concentrated sulfuric acid in 150 ml. of acetic acid.

The reaction mixture was stirred for an additional 45 minutes and then it was worked up by the procedure of Example 1. The bromochlorobenzene product was found to consist of ortho and para isomers in a ratio of 0.31 to 1. No unreacted chlorobenzene was found.

Bromination of chlorobenzene with elemental bromine according to conventional procedure yields the ortho and para isomers in a ratio of about 0.1 to 1.

*Example 8*

A solution of 45.3 g. of sodium bromate in 150 ml. of water was added at 15–32° C. to a stirred mixture of 94.5 g. of oxalic acid dihydrate, 0.70 g. mole of perchloric acid, 55.4 g. of toluene, and 150 ml. each of water and tetramethylene sulfone. The addition was complete in two hours. The reaction mixture was worked up as described in the above examples and it was found that 88.2% of the toluene had been converted to monobromotoluenes of which 61.6% was the ortho isomer, 36.8% was the para isomer, and 1.6% was m-bromotoluene.

I claim:
1. A process for ring brominating a substituted benzene of the formula

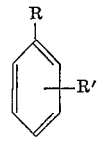

wherein R is selected from the group consisting of lower alkyl, lower alkoxy, aryloxy, and halogen and R' is selected from the group consisting of R and hydrogen, which process comprises maintaining a reaction mixture consisting essentially of said substituted benzene and a member selected from the group consisting of
   (a) aqueous bromic acid and
   (b) aqueous bromic acid plus an acid selected from the group consisting of sulfuric acid, toluenesulfonic acid, nitric acid, and perchloric acid at a temperature between the freezing point of said mixture and about 100° C. for a length of time sufficient to obtain a substantial degree of bromination.

2. A process for making o-bromotoluene which comprises forming a reaction mixture consisting essentially of toluene and aqueous bromic acid and maintaining the toluene and aqueous bromic acid in intimate contact at a temperature between the freezing point of the reaction mixture and about 100° C. for a time sufficient for a substantial quantity of o-bromotoluene to have formed.

3. The process of claim 1 wherein the reaction mixture includes at least about one equivalent per mole of bromic acid of an acid selected from the group consisting of sulfuric acid, toluenesulfonic acid, nitric acid, and perchloric acid.

4. The process of claim 1 wherein the reaction mixture includes a reducing agent selected from the group consisting of oxalic acid, formic acid, and formaldehyde.

References Cited by the Examiner

UNITED STATES PATENTS 2,803,675  8/1957  Dreisbach _____ 260—651
2,835,700  5/1958  Boyle _____ 260—650 X

OTHER REFERENCES

De La Mare et al.: Aromatic Substitution (1959), page 110.

Kraft et al.: "Chemische Berichte," Jahrg 8 (1875), pp. 1044–5.

Derbyshire et al.: "Jour. Chem. Soc." (London) (1950), pp. 564–577.

BERNARD HELFIN, *Primary Examiner.*

LEON ZITVER, *Examiner.*

K. V. ROCKEY, *Assistant Examiner.*